United States Patent Office 2,709,693
Patented May 31, 1955

2,709,693

ETHERIFIED CONDENSATION PRODUCTS OF FORMALDEHYDE WITH AMINO-1:3:5-TRIAZINES CONTAINING AT LEAST TWO AMINO-GROUPS

Gustav Widmer, Basel, Switzerland, assignor to Ciba Limited, Basel, Switzerland, a firm of Switzerland No Drawing. Application November 27, 1951, Serial No. 258,534

Claims priority, application Switzerland, December 4, 1950

10 Claims. (Cl. 260—67.6)

It is known to etherify with alcohols under acid conditions condensation products containing methylol groups and made by condensing formaldehyde with amino-1:3:5-triazines, such condensation products being called methylol-aminotriazines (hydroxymethyl-aminotriazines), the etherified products being soluble in organic solvents. Depending on the nature of the alcohol and the condensation product used the number of alkoxy groups in the alkyl ethers of the condensation products (alkoxy-methyl-aminotriazines) prepared in this manner varies. With lower alcohols, such as methyl, ethyl, propyl and butyl alcohol, the condensation products can be etherified rather easily. Thus, for example, in the esterification of hexa-methylol-melamine with methanol up to 6 mols of methoxy groups are introduced per mol of melamine, whereas with ethyl, propyl and butyl alcohol fewer alkoxy groups are introduced. On the other hand when higher alcohols are used, that is to say, those containing more than 4 carbon atoms, only 1.5 to 0.5 mol of alkoxy groups can be introduced per mol of melamine. The term "mol" is used herein to mean a molecular proportion.

It is also known to react alkyl ethers of methylol aminotriazines, of which the alkyl groups contain less than 5 carbon atoms, (that is to say, lower alkoxy methyl-aminotriazines) with higher alcohols containing more than 4 carbon atoms accompanied by the splitting off of the lower alcohol. This reaction is hereinafter referred to as re-etherification. However, the methods described in the literature for carrying out such re-etherification do not enable more than about 1.5 to 2 mols of the higher alcohol, that is to say, not more than about 0.5 to 0.6 mol per $NH_2$-group of the amino triazine, to be introduced into 1 mol of the lower alkoxy methyl-aminotriazine.

The present invention provides a process for the manufacture of an esterified condensation product of formaldehyde with an amino-1:3:5-triazine containing at least two $NH_2$-groups, which etherified condensation product contains per $NH_2$-group of the aminotriazine at least one hydroxymethyl group etherified with a higher alcohol containing at least 5 carbon atoms, by the re-etherification with such a higher alcohol in the presence of a catalyst of acid nature of an aminotriazine-formaldehyde condensation product, in which at least one hydroxymethyl group per $NH_2$-group of the aminotriazine is etherified with a lower alcohol containing at most 4 carbon atoms, wherein the re-etherification is conducted at a raised temperature under practically anhydrous conditions until at least one mol of the lower alcohol per $NH_2$-group of the aminotriazine has been split off, and for the greater part removed from the reaction mixture, and the catalyst is eliminated from the reaction mixture after the re-etherification.

If it is attempted to re-etherify the alkoxy methyl-aminotriazines, for example, methoxy-methyl-melamine, generally used in commerce, which contain less than one methoxy group per amino group of the melamine, with higher alcohols in the presence of small quantities of acid under practically anhydrous conditions, the reaction mixture gelatinises in a short time at a raised temperature. If, however, there are used methoxy-methyl melamines, which contain at least three, and preferably 4 to 6 methoxy groups per mol of melamine, that is to say at least one, and advantageously 1.3 to 2, methoxy methyl groups per amino group, it is found that upon heating the methyl alcohol splits off smoothly and is replaced by the higher alcohol. Accordingly, the methoxy-methyl melamines containing at least three methoxy groups are much more stable to heat than those containing fewer methoxy groups. They are distinguished from the lower substituted methoxy methyl-melamines most generally used in commerce, for example, for textile purposes, and which have unlimited solubility in hot and cold water, by the fact that they have unlimited solubility only in cold water, and have a limited solubility in hot water so that layer separation occurs.

By carrying out the re-etherification with the splitting off of methanol, advantageously with the application of slightly reduced pressure and while slowly increasing the temperature, for example, from 100° C. up to 160° C., until the evolution of methanol ceases it is possible to ensure that approximately the theoretically possible quantity of methanol is split off, and that in its place approximately the same molecular proportion of the higher alcohol has entered the hydroxymethyl-melamine. It appears important to maintain mild reaction conditions, such as are described in the examples given below, as more severe conditions, such as too high a concentration of acid or too high a temperature, generally lead to failure owing to gelatinisation. A further important requirement is the removal of the acid after the re-etherification. After the reaction the final product should not be exposed much longer at a raised temperature to the action of the catalyst, because otherwise hardening occurs. Thus, before the excess of the higher alcohol is removed by distillation, which usually necessitates prolonged heating at 150° C. to about 300° C., the catalyst must be removed or rendered harmless, for example, by neutralising the acid. Only in exceptional cases is no neutralisation necessary, namely when an acid anhydride is used, for example, phthalic anhydride or maleic anhydride, which has a volatility such that it can be distilled off together with the excess of the higher alcohol.

The aminotriazine-formaldehyde condensation products used as starting materials for the re-etherification, and which are in themselves known and contain per $NH_2$-group of the aminotriazine at least one hydroxymethyl group etherified with an alcohol containing at most 4 carbon atoms, can be prepared by known methods by the action of corresponding quantities of formaldehyde on the amino triazine, which contains at least two $NH_2$ groups, and can be obtained by the simultaneous or subsequent etherification of the resulting methylol-aminotriazine or mixture of methylol-aminotriazines with the alcohol, such as ethyl, propyl, butyl or advantageously methyl alcohol. In this manner mixtures which are suitable for the present process are very often obtained, provided that they contain at least one etherified hydroxymethyl group per amino group in the quantity of aminotriazine used.

As aminotriazines there may be used all aminotriazines, which contain at least two $NH_2$-groups, provided that they can be converted with formaldehyde into the corresponding methylol compounds and subsequently etherified. However, for reasons of economy it is desirable to use the most easily accessible products, especially melamine, but also N-phenyl-melamine, benzoguanamine, acetoguanamine, formoguanamine, ammeline, 2:4-diamino-6-chloro-1:3:5-triazine and the like.

As alcohols containing at least 5 carbon atoms, which are to be used for introducing the higher alkoxy groups, there come into consideration primarily readily accessible monohydric alcohols of the aliphatic, aromatic, hydroaromatic or heterocyclic series, having branched or unbranched chains. They may also be of an unsaturated character. There may be mentioned, for example: myricyl, ceryl, stearyl, cetyl, lauryl, octyl, hexyl, amyl, oleyl, linoleyl and linolenyl alcohol, cyclohexanol, methyl-cyclohexanol, benzyl alcohol, abietinol, terpineol, menthol, borneol, phenyl-ethyl alcohol, cinnamyl alcohol, furfuryl alcohol and the like. Also very suitable are alcohols or mixtures of alcohols, which are obtainable by the reduction of fatty acids obtained by the oxidation of paraffin wax, and also the higher alcohols obtainable by total synthesis from carbon monoxide and hydrogen or mixtures of such alcohols.

Excellently suitable also are commercial mixtures of unsaturated and saturated fatty alcohols such as are obtainable, for example, from triglyceride oils such as drying, semi-drying, oven-drying or non-drying oils by reduction with sodium and alcohol or by other methods. Such oils are, for example, linseed oil, soya bean oil, hemp oil, poppy seed oil, wood oil, dehydrated castor oil, cotton seed oil, coconut oil, cod liver oil, whale oil, menhaden oil, sperm oil, etc.. The alcohols obtainable from tall oil can also be used.

As catalyst there may be used inorganic or organic acids, or substances which yield acids during the reaction or act in a manner analogous to acids, for example, acid anhydrides or Friedel-Crafts catalysts. The selection of the catalyst is preferably governed by practical considerations, such as the ease with which it can be removed, cost and its influence on the final product. In order to carry out the re-etherification under practically anhydrous conditions it is of advantage to use catalysts as free as possible from water. Advantageous catalysts are, for example, concentrated hydrochloric acid, sulfuric acid, phosphoric acid, hypophosphorous acid, phthalic acid, phthalic anhydride, maleic anhydride, chloracetic acid, formic acid and the like. The catalysts are in general hardening agents for the lower alkoxy methylaminotriazines used as starting materials and also for the final products. It is therefore of advantage not to use too large a quantity of the catalyst. There generally suffice quantities ranging from a few permils to a few percents calculated on the total reaction mixture. In order to obtain stable neutral to slightly basic final products it is of advantage to use catalysts which can be eliminated from the reaction mixture after the reaction, that is to say, before the further working up of the reaction mixture, by simple means, such as distillation or neutralisation followed, if desired, by filtration to remove the precipitated salts or washing with water or solvents. This applies especially when strong acids are used as catalysts, which must be especially carefully neutralised. These methods of eliminating the catalyst should exert no disadvantageous effect on the final products.

It has been found to be generally of advantage, after the reaction and, if desired, after eliminating the catalyst from the reaction mixture, to remove any excess of unreacted higher alcohol which may be present by a simple means, such as distillation, advantageously under reduced pressure, or washing or extraction with a suitable solvent.

The new products, depending on the nature of the higher alcohols used, are after final purification practically neutral, liquid, oily to salve-like, waxy or solid substances. Octyl alcohol yields, for example, a liquid product; a mixture of soya bean alcohols or linseed oil alcohols yields oily to highly viscous products; stearyl alcohol yields a white solid waxy product; and solid alcohols such, for example, as abietin alcohol, yield spring-hard resins. These products can be used for many purposes, for example, as completely neutral acid-binding oils, bases for salves, waxes, and as binding agents of all kinds. Highly unsaturated higher alcohols yield products which, after the addition of siccatives, dry very well and are suitable as raw materials for lacquers. The resin obtained from abietin alcohol is also very suitable as a raw material for lacquers. The new products are insoluble or slightly soluble in water and frequently also in lower alcohols, but they dissolve well in solvents having a pronounced organic character, such as esters, ketones, higher alcohols and especially aromatic and aliphatic hydrocarbons. They are compatible with fatty oils, which are soluble in solvents having a pronounced organic character, and also with a large number of natural and artificial resins, such as colophony and its derivatives, colophony-phenol resins, soluble phenol resins, maleic acid esters, copals in the molten state, alkyd resins, styrolised oils, condensation resins soluble in organic solvents, for example, urea and aminotriazine resins, and also soluble ketone and vinyl resins, resins containing epoxide groups, and the like. The solubility or compatibility of the products is strongly influenced by the nature and number of higher alkoxy groups therein.

The new products, which are obtained by the use of fatty alcohols from drying or semi-drying oils, appear to be especially interesting for use as binding agents that dry rapidly in the air. The presence of ether bonds makes the products completely neutral, and they have indeed a weakly acid-binding action owing to the weakly basic aminotriazine nucleus. Their drying capacity at ordinary temperature in the air and also at a raised temperature in an oven is quite unexpected. Whereas linseed oil, the triglyceride of linoleic acid, containing siccatives takes 8 hours to become dust dry in a thin layer and at least 24 hours to become to some degree non-adhesive, there is obtained with the product, which contains linoleyl alcohol, described in Example 3(a) and (b) below, coatings which are dust-dry in one hour and are non-adhesive after a few hours. After 16–24 hours such coatings have dried completely through, that is to say, they are in a condition which cannot be obtained with linseed oil. The speed of drying of the new products is therefore considerably better than that of linseed oil, and this could not be foreseen.

The improvement in speed of drying is exhibited also in the case of the products of the invention which are obtained by the use of fatty alcohols obtainable from oils, such, for example, as shark liver oil, cod liver oil, sperm oil, cotton seed oil, etc., which are normally not used for lacquers. These products frequently exhibit slight air-drying properties even at ordinary temperature and are in many cases excellently suited for the production of oven-drying oil films. For example, alkoxy methyl-melamines, which contain about 4.5 mols of shark oil alcohol, sperm oil alcohol or cod liver oil alcohol, dry at 100° C. in one hour to practically colorless coatings resembling linseed oil films, and after an hour at 170° C. they form tough films which are well through-dried and exhibit little yellowing.

The products of the invention in some cases exhibit considerable improvement with respect to fastness to light and resistance to the weather.

In describing the properties of the new products the following constants are used:

The viscosity is expressed in centipoises (cps.), the softening point is determined according to the Krämer-Sarnow method (KS), the acid number (SZ), saponification number (VZ), the nitrogen content (N) and also the hydroxyl number (OHZ). The OHZ represents the value obtained by subtracting the number of milligrams of potassium hydroxide which is required for titrating the acetic anhydride unconsumed in the acetylation from the number of milligrams of potassium hydroxide, which is equivalent to the quantity of acetic anhydride employed in acetylation. For determining the OHZ 1 to 1.2 grams of the reaction product are reacted with 10 cc. of a mixture of 1.2 cc. of acetic anhydride and 8.8 cc.

of pyridine by boiling the mixture for 20 minutes under reflux, and then the unconsumed acetic anhydride is titrated with a ½ N aqueous solution of sodium hydroxide using phenolphthalein as indicator. As 10 cc. of the acetic anhydride-pyridine mixture consume about 24 cc. of 1N-sodium hydroxide solution, the OHZ can be calculated from this value and the quantity of the standard solution consumed by the neutralisation which follows acetylation.

It has been found that among the products obtainable by the process of the invention those having a hydroxyl number below 100 are of interest, and especially valuable are the products having a hydroxyl number below 20.

As will be seen from the examples given below, the new products can be made in various ways. A preferred method is as follows:

A methoxy methyl-melamine containing about 4–5 methoxy groups per mol of melamine and the alcohol of high molecular weight to be reacted therewith and containing 5 or more carbon atoms per molecule are advantageously heated under slightly reduced pressure and with the addition of a small quantity of the catalyst. The relative proportions of the two starting materials may vary widely. Advantageously, there is used for each methoxy group 1 mol of the higher alcohol; however, there may be used less than, but preferably more than, 1 mol of the alcohol per methoxy group, and the excess of the higher alcohol is removed after the reaction by distillation, washing or extraction. As the temperature increases the reaction sets in generally at 60–120° C. depending on the quantity and nature of the catalyst. The methyl alcohol split off is continuously distilled, and can be collected almost quantitatively in a receiver. With the use of a small quantity of catalyst the reaction can generally be brought to an end at between 120 and 150° C. in the course of 1 to several hours, the catalyst being removed by one of the methods described above. If an excess of the higher alcohol is present, or a solvent has been used, it can be removed by distillation, washing out with suitable solvents or the like.

The following examples illustrate the invention, the parts and percentages being by weight:

Example 1

About 1/10 mol (39 grams) of a methoxy methyl-melamine having a content of 5.3 mols of methoxy groups per mol of melamine are heated with 1 mol (270 grams) of stearyl alcohol and 0.67 gram of hypophosphorus acid of 60 per cent. strength in a flask fitted with a stirrer and a thermometer and immersed in an oil bath. The apparatus is provided with a vertical condenser having a receiver, and an additional receiver cooled with a mixture of carbon dioxide and acetone, and is maintained under a pressure of about 400–500 mm. pressure of mercury. At about 110° C. the reaction sets in with the splitting off of methanol, which distils, and the reaction is brought practically to an end by raising the internal temperature up to 160° C. in the course of 2 hours. When the distillation ceases 19.5 cc. of almost pure methanol have been distilled over. 0.2 gram of pure sodium hydroxide dissolved in 3 cc. of alcohol is then added. After intimate mixing to cause neutralisation, the reaction mixture is filtered hot to remove the salt formed. The excess of stearyl alcohol is then distilled under a good vacuum. There are obtained 143 grams of stearyl alcohol, and a residue containing 141 grams of a stearyl-hydroxymethyl-melamine which contains about 4.5 mols of stearyl alcohol bound in ether-like manner per mol of melamine. The product is a white hard wax which has a softening point of 66° C., dissolves well in benzine and has strong water-repellent properties. The SZ and OHZ amount to 0, and N= 6.60 per cent.

Example 2

The procedure is the same as that described in Example 1, except that, instead of the 1/10 mol of methoxy methyl-melamine having a content of 5.3 methoxy groups per mol of melamine, there is used 1/10 mol (64.2 grams) of a butoxy methyl-melamine containing about 5 mols of butoxy groups per mol of melamine. In this manner 150 grams of a white, hard, wax-like residue are obtained which possesses practically the same properties as the product of Example 1. It contains about 4.5 mols of stearyl alcohol bound in ether-like manner per mol of melamine and has the following constants: SZ=0; OHZ=16; N=7.02 per cent.

Example 3

(a) 4/10 mol (156 grams) of the methoxy methyl-melamine used in Example 1 are heated with 1.6 mols (424 grams) of a linoleyl alcohol mixture obtained as described below, and 12 grams of phthalic anhydride under slightly reduced pressure in a flask provided with stirring mechanism and immersed in an oil bath. 53 grams of methanol distil over at between 120 and 150° C. in the course of 2½ hours. The temperature is then raised with the application of a good vacuum (a pressure of a few millimeters of mercury or lower). In the vertical condenser crystals form which are pure phthalic anhydride. At the same time about 10 grams of unreacted linoleyl alcohol distil over at an internal temperature of about 250° C. In the residue there is obtained in a yield of about 505 grams a liquid brownish colored oil which has the following constants: SZ=0; OHZ=0; N=7.73 per cent.; viscosity about 400 cps. It contains per mol of melamine about 4 mols of linoleyl alcohol and has air-drying properties similar to those, for example, of wood oil. With or without the addition of driers it rapidly yields with film formation when applied in thin layers coatings which crimp as in the case of crude wood oil.

(b) If the resulting product is further heated, for example, for 2 hours at 250° C., it thickens to give a viscosity of about 2000 cps. This heat-treated product, which has excellent solubility in benzine, is suitable as a binding agent for air-drying clear lacquers or pigmented coatings, which are dust dry in one hour and through dry overnight to form smooth unobjectionable surfaces. The good results obtained by rapid weathering of these coatings in an Atlas weatherometer show that such coatings can be expected to have a good resistance to weather in the open air.

The linoleyl alcohol mixture used above is made by the reduction of linseed oil with sodium and alcohol and has the following constants: SZ=0; VZ=0; iodine number (JZ)=170; OHZ=204. Its average molecular weight is calculated at about 265.

Example 4

3/10 mol (117 grams) of the methoxy methyl-melamine used in Example 1 is reacted under the conditions given in Example 3 with 1.8 mol (477 grams) of soya bean alcohol, prepared as described below. 46 grams of methyl alcohol are distilled off. About 114 grams of unreacted soya bean alcohol is recovered, and there is obtained as the residue 446 grams of a pale colored oil having the following constants: SZ=0; OHZ=6; N=6.79 per cent.; viscosity about 300 cps.

After heating for 4 hours at about 250° C. the viscosity rises to about 800 cps. The product contains about 4.7 mols of soya bean alcohol bound in either-like manner per mol of melamine. When mixed with the usual driers, for example, 0.2 per cent. of lead or 0.04 per cent. of cobalt siccative, it has excellent drying properties in that it is dust-dry in 2 hours and through-dry in about 12 hours, clear or pigmented coatings being obtained which show good resistance to weathering when tested by rapid weathering in the Atlas weatherometer.

The soya bean alcohol mixture used above is obtained by a method analogous to that described in Example 3 for producing the linoleyl alcohol mixture, namely from soya bean oil by reduction with sodium and alcohol. Its constants are: SZ=0; VZ=0; JZ=about 130; OHZ=215.

Instead of the soya bean alcohol mixture used in this example, there may be used the fatty alcohols of other drying, semi-drying or non-drying oils for making the higher alkoxy-methyl melamines such, for example, as unsaturated and saturated fatty alcohols obtainable by reduction with sodium and alcohol, or saturated fatty alcohols such as are obtainable by reduction under pressure with hydrogen and a hydrogenating catalyst. As the degree of saturation of the fatty alcohol increases, that is to say, as the number of double bonds decreases, the drying properties of the resulting products decrease and finally disappear. While, for example, rapid drying products can be obtained with soya bean alcohols, by the use of fish oil alcohols having a low iodine number, for example, shark liver oil having a JZ of 110, raw materials for lacquer having air-drying properties can no longer be obtained.

Example 5

3/10 mol (117 grams) of the methoxy methyl-melamine used in Example 1 are reacted with 1.8 mol (505 grams) of commercial abietinol with the use of 12 grams of phthalic anhydride as a catalyst at 120–155° C. for 2 hours under slightly reduced pressure, 44 grams of methanol being distilled off. While slowly raising the temperature to 275° C. and using a good vacuum 77 grams of excess abietinol, which also contains by-products such as hydrocarbons, together with phthalic anhydride are distilled off. As the residue there is obtained 495 grams of a pale brownish yellow, clear spring-hard resin having a KS of 91°, and the following constants: SZ=0; OHZ=4.5; N=5.54 per cent.

The product contains about 4.9 mols of abietinol bound in either-like manner per mol of melamine. It can be used, for example, as a neutral unsaponifiable hard resin in the production of lacquers.

Example 6

By reacting drying fatty alcohols and abietinol with lower alkoxymethyl-aminotriazines there are obtained very highly viscous products which contain the drying fatty alcohol component and the non-drying resin alcohol component bound in ether-like manner and which are very suitable as lacquer raw materials for producing coatings.

3/10 mol (79 grams) of linoleyl alcohol, prepared as described in the last paragraph of Example 3, 2/10 mol (57.6 grams) of abietinol and 1/10 mol (39 grams) of the methoxy-methyl-melamine used in Example 1 are reacted under slightly reduced pressure at 130–155° C. for 2 hours in the presence of 0.6 gram of hypophosphorous acid of 60 per cent. strength as catalyst, about 15 grams of methanol distilling off. The hypophosphorous acid is then neutralised with 0.3 gram of sodium carbonate, and the precipitated salt is separated from the hot reaction mass by filtration. The filtrate is heated under a pressure of 0.1 mm. of mercury at 255° C., whereby 11 grams of a high boiling distillate and 145 grams of a very highly viscous, pale yellow residue having the following constants are obtained: SZ=0; (VZ=0); OHZ=6.0; N=6.61 per cent.; viscosity=47000 cps.

The product contains about 4.4 mols of the alcohol mixture used bound in an ether-like manner per mol of melamine. After the addition of driers, for example 0.2 per cent. of lead or 0.04 per cent. of cobalt siccative, and after suitable dilution with benzine, the product can be used very well as a coating composition. Such coatings are dust-dry in about 1 hour and are through-dry after about 12 hours, highly glossy pale coatings being obtained.

Example 7

About 1/10 mole (30.1 grams) of a methoxymethyl-acetoguanamine having a content of methoxy groups of about 3.2 mols is maintained at 150° C. for 2 hours under reduced pressure (pressure of about 400 mm. of mercury) with 7/20 of a mole (92.5 grams) of linoleyl alcohol, prepared as described in the last paragraph of Example 3, in the presence of 0.33 gram of hypophosphorous acid of 60 per cent. strength as catalyst. 10 grams of methanol distil over, and are collected in a receiver cooled with ice connected to a further receiver cooled with a mixture of carbon dioxide and acetone. The contents of the flask are then rendered weakly basic with 3 cc. of 0.4 N-caustic potash solution. 29 grams of excess linoleyl alcohol are then distilled off under a good vacuum (pressure of about 0.2 mm of mercury). The residue amounts to 80 grams and has the following constants: SZ=0; OHZ=2.7; N=8.78 per cent.; viscosity=600 cps.

The pale colored oil dries, when driers are added thereto in the normal manner, to a dust-dry condition in about 2 hours and to a pale well through-dried film after about 12 hours. The product contains about 2.3 mols of linoleyl alcohol bound in an ether-like manner per mol of acetoguanamine.

Example 8

The procedure is the same as that described in Example 7, except that in the present example 4/10 mol (106 grams) of linoleyl alcohol is reacted with 36.3 grams of a methoxy methyl-benzoguanamine, which contains 3.75 methoxy groups per mol of benzoguanamine, in the presence of 2.8 grams of phthalic anhydride as catalyst. There are obtained, in addition to 8 grams of methyl alcohol and 26 grams of recovered linoleyl alcohol, a residue of 82.6 grams in the form of a pale oil which dries well with the addition of driers, and which has drying properties similar to those of the product of Example 7. Its constants are as follows: SZ=0; OHZ=11.3; N=8.77 per cent.; viscosity=1100 cps. It contains about 2.0 mols of linoleyl alcohol bound in an ether-like manner per mol of benzoguanamine.

Example 9

In the following table are shown the results of experiments carried out in accordance with the invention by the procedures described in the foregoing examples.

In examples a to l and also n and o, there was used as starting material about 1/10 mol (39 grams) of methoxy methyl-melamines, which as determined by the method of Zeisel contained 4.2, 5.3 and 5.95 methoxy groups respectively per mol of melamine. The nature of the ethers is designated in the table by the references 4.2, 4.3 and 5.95, respectively. In the experiment m about 1/10 mol (47.4 grams) of an ethoxy methyl-melamine having a content of 5.1 moles of ethoxy groups per mol of melamine was used. In the column headed "Final Product" are given the yields in grams and the number of mols of the higher alkyl residue introduced per mol of melamine calculated from the yield. Furthermore the properties of the products are described by reference to their nitrogen content (N), viscosity in centipoises (cps.), hydroxyl number (OHZ) and short statements of their properties. The acid number was in all cases zero. In all experiments the reaction was conducted at 150° C. for 2 hours and in experiment a without the application of reduced pressure, and in experiments b to o under a pressure of about 400 mm. of mercury. In working up the reaction products in experiments g, h and m, in which phthalic anhydride was used as catalyst, the latter was distilled off together with the excess of higher alcohol with the use of a good vacuum, while in all the other experiments the catalyst was first neutralised and then the excess of the higher alcohol was distilled off.

| Experiment | Starting material | | | | Final Product | | | | | |
|---|---|---|---|---|---|---|---|---|---|---|
| | Nature of the ether | Higher alcohol (alc.) | | Grams of catalyst | Yield in grams | Higher alkyl residues per mol of melamine | OHZ | Viscosity in cps. | Percent N | Remarks and properties of the product |
| | | Mol'/10 | grams | | | | | | | |
| a | 5.95 | 12 | 105.6 Amyl-Alc | 0.1 H₂SO₄ | 67 | 5.29 | 0 | 50,000 | 14.48 | pale yellow very highly viscous oil. |
| b | 5.95 | 12 | 156 Octanol sec | 0.1 H₂SO₄ | 79 | 4.35 | 9.0 | 740 | 10.63 | pale viscous oil. |
| c | 5.3 | 10 | 98 Furfuryl-Alc | 0.1 H₃PO₂ | 76 | 5.38 | 15.8 | 70,000 | 12.80 | pale very highly viscous oil. |
| d | 5.3 | 4 | 182 Myricyl-Alc | 0.24 H₃PO₂ | 152 | 2.76 | 7.6 | | 6.12 | pale brownish colered wax like substance. |
| e | 5.95 | 12 | 129.6 Benzyl-Alc | 0.17 HCl | 82 | 5.56 | 7.5 | 615 | 10.64 | thickly liquid brownish colored oil. |
| f | 5.3 | 10 | 186.3 Lauryl-Alc | 0.22 H₂SO₄ | 86 | 3.26 | 14.5 | 2,100 | 10.88 | pale thick oil. |
| g | 5.3 | 6 | 159 Unsaturated alcohol obtained by reducing dehydrated castor oil. | 4 phthalic anhydride. | 140 | 4.19 | 17.0 | 2,600 | 6.87 | very pale thick oil; dries slowly with driers somewhat like lacquer linseed oil containing driers. |
| h | 5.3 | 6 | 159 Wood oil alc | do | 150 | 4.71 | 10.0 | 740 | 6.25 | very pale thick oil, dries rapidly with driers like the products of Example 3(b). |
| i | 5.3 | 10 | 144 Methylcyclohexanol | 0.36 H₃PO₂ | 73.3 | 3.58 | 5.6 | | 11.98 | pale clear resin; KS=40° C. |
| k | 5.95 | 10 | 154 Terpineol | 0.25 H₃PO₂ | 58.5 | 2.47 | 0 | | 13.82 | very pale clear resin; KS=52° C. |
| l | 4.2 | 10 | 270 Stearyl-Alc | 0.4 H₃PO₂ | 153 | 4.67 | 3.2 | | 6.32 | white, rather hard, wax like substance. |
| m | 5.1 (ethoxy). | 5 | 132.5 Linoleyl-Alc | 3.8 Phthalic anhydride. | 142 | 4.6 | 3.2 | 670 | 6.57 | dries rapidly with driers like the product of Example 3(a). |
| n | 5.3 | 4 | 106 Poppy seed oil-alc | 0.1 H₃PO₂ | 129 | 4.0 | 1.4 | 378 | 7.55 | very pale, clear oil; dries very rapidly with driers (dust-dry in one hour). |
| o | 5.3 | 4 | 106 Hemp oil-Alc | 0.1 H₃PO₂ | 133 | 4.0 | 10.9 | 329 | 6.96 | very pale, clear oil, drying rapidly with driers (dust-dry in 2 hours). |

What is claimed is:

1. An air-drying ether of a formaldehyde condensation product of an aminotriazine containing at least two NH₂-groups in which ether at least one hydroxymethyl group per NH₂-group present in the aminotriazine is etherified with a monohydric unsubstituted unsaturated aliphatic alcohol having at least 18 carbon atoms and containing at least two double bonds.

2. An air-drying ether of a formaldehyde condensation product of an aminotriazine selected from the group consisting of formoguanamine, acetoguanamine, benzoguanamine, melamine and phenylmelamine in which ether at least one hydroxymethyl group per NH₂-group present in the aminotriazine is etherified with a monohydric unsubstituted unsaturated aliphatic alcohol having at least 18 carbon atoms and containing at least two double bonds.

3. An air-drying ether of a formaldehyde condensation product of melamine in which ether at least three hydroxymethyl groups are etherified with a monohydric unsubstituted unsaturated aliphatic alcohol having at least 18 carbon atoms and containing at least two double bonds.

4. An air-drying ether of a formaldehyde condensation production of formoguanamine in which ether at least two hydroxymethyl groups ar etherified with a monohydric unsubstituted unsaturated aliphatic alcohol having at least 18 carbon atoms and containing at least two double bonds.

5. An air-drying ether of a formaldehyde condensation product of benzoguanamine in which ether at least two hydroxymethyl groups are etherified with a monohydric unsubstitued unsaturated aliphatic alcohol having at least 18 carbon atoms and containing at least two double bonds.

6. An air-drying ether of a formaldehyde condensation product of an aminotriazine containing at least two NH₂-groups in which ether at least one hydroxymethyl group per NH₂-group present in the aminotriazine is etherified with a mixture of monohydric unsubstituted unsaturated aliphatic alcohols having at least 18 carbon atoms, said mixture of alcohols being obtained by reducing triglyceride oils selected from the group consisting of linseed oil, soya oil, dehydrated castor oil, hempseed oil, poppy seed oil and wood oil.

7. An air-drying ether of a formaldehyde condensation product of an aminotriazine from the group consisting of formoguanamine, acetoguanamine, benzoguanamine, melamine and phenylmelamine in which ether at least one hydroxymethyl group per NH₂-group present in the aminotriazine is etherified with a mixture of monohydric unsubstituted unsaturated aliphatic alcohols having at least 18 carbon atoms, said mixture of alcohols being obtained by reducing triglyceride oils of the group consisting of linseed oil, soya oil, dehydrated castor oil, hemp seed oil, poppy seed oil and wood oil.

8. An air-drying ether of a formaldehyde condensation product of melamine in which ether at least three hydroxymethyl groups are etherified with a mixture of monohydric unsubstituted unsaturated aliphatic alcohols having at least 18 carbon atoms, said mixture of alcohols being obtained by reducing triglyceride oils of the group consisting of linseed oil, soya oil, dehydrated castor oil, hemp seed oil, poppy seed oil and wood oil.

9. An air-drying composition containing an ether as claimed in claim 2.

10. An air-drying coating composition containing an ether as claimed in claim 2.

(References on following page)

References Cited in the file of this patent

UNITED STATES PATENTS

| | | | |
|---|---|---|---|
| Re. 22,566 | Johnston | Nov. 21, | 1944 |
| 2,213,921 | Sorenson | Sept 3, | 1940 |
| 2,290,132 | Swain | July 14, | 1942 |
| 2,426,770 | Grim | Sept. 7, | 1947 |
| 2,433,802 | West | Dec. 30, | 1947 |
| 2,509,174 | Scott | May 23, | 1950 |
| 2,524,472 | Parker | Oct. 3, | 1950 |
| 2,619,476 | Malinowski | Nov. 25, | 1952 |